United States Patent
Dodson, III

(10) Patent No.: US 6,824,362 B2
(45) Date of Patent: Nov. 30, 2004

(54) FAN CONTROL SYSTEM

(75) Inventor: George Bertram Dodson, III, Glendale, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 45 days.

(21) Appl. No.: 10/195,240

(22) Filed: Jul. 15, 2002

(65) Prior Publication Data

US 2004/0009074 A1 Jan. 15, 2004

(51) Int. Cl.[7] .......................... F04B 49/00; F04B 49/06
(52) U.S. Cl. ..................... 417/22; 417/42; 417/44.1; 417/43; 340/661
(58) Field of Search .................. 417/22, 42, 43, 417/44.1, 423.1, 18, 53, 145, 32, 63; 340/636.12, 636.13, 660, 661, 662, 663, 635, 641, 648, 606, 611, 626; 318/599, 811; 388/800, 804, 811, 819

(56) References Cited

U.S. PATENT DOCUMENTS

| | | | | |
|---|---|---|---|---|
| 4,605,883 A | * | 8/1986 | Cockroft ..................... | 388/815 |
| 5,159,218 A | * | 10/1992 | Murry et al. ............. | 310/68 B |
| 5,534,854 A | * | 7/1996 | Bradbury et al. ........... | 340/648 |
| 5,675,480 A | * | 10/1997 | Stanford ...................... | 307/58 |
| 5,727,928 A | * | 3/1998 | Brown .................... | 417/44.11 |
| 5,790,430 A | * | 8/1998 | Steiert ........................ | 340/648 |
| 6,008,603 A | * | 12/1999 | Jones et al. ................. | 318/254 |
| 6,385,395 B1 | * | 5/2002 | Horng et al. ............... | 388/809 |
| 6,428,282 B1 | * | 8/2002 | Langley ........................ | 417/2 |

FOREIGN PATENT DOCUMENTS

JP            59-131763       * 7/1984

* cited by examiner

Primary Examiner—Charles G. Freay
(74) Attorney, Agent, or Firm—Fogg and Associates, LLC; Laura A. Ryan

(57) ABSTRACT

A fan control system uses a closed loop system to adjust the actual operating speed of a fan or fans to a desired operating speed. The desired speed and actual speed are compared in a high gain amplifier to generate a control signal to adjust the actual operating speed of the fan given the feedback.

26 Claims, 2 Drawing Sheets

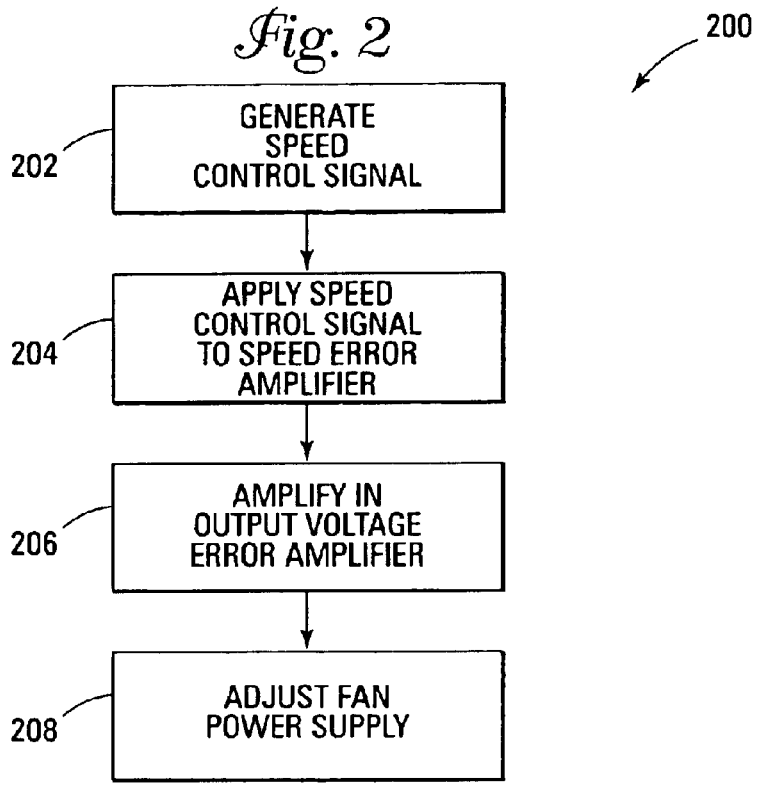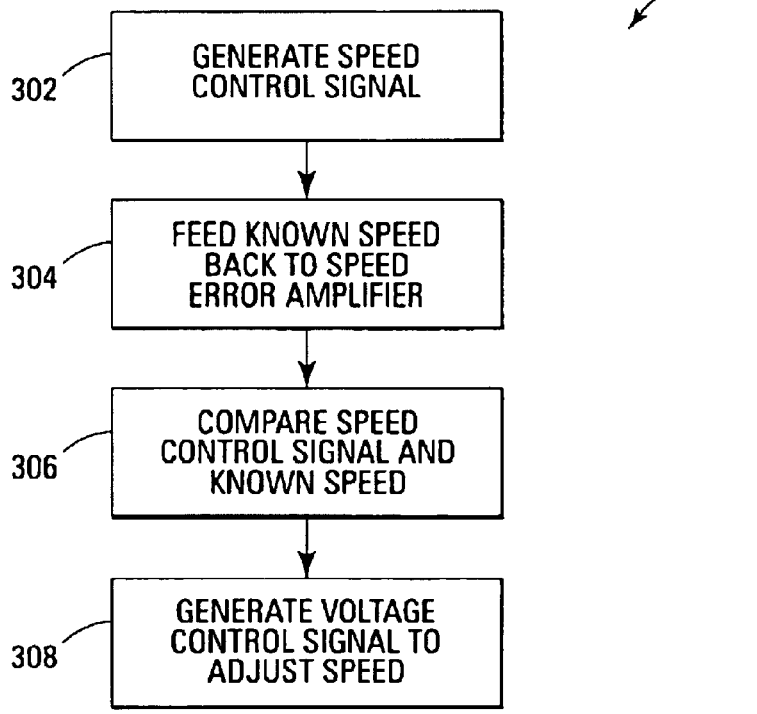

FAN CONTROL SYSTEM

FIELD

The present invention relates generally to electronic equipment and in particular the present invention relates to management of fan cooling for electronic equipment.

BACKGROUND

In high power density electronic systems, it frequently becomes necessary to use forced air-cooling to prevent equipment overheating. Heat sinks and electric fans are typically used to dissipate the heat generated by the electronic equipment. Some systems, such as telecommunication equipment, have maximum acoustic noise restrictions. These restrictions are primarily directed at the noise produced by the electric fan(s) used to cool the equipment. Often the cooling requirements and noise restrictions cannot all be satisfied simultaneously.

Further, open loop fan systems have a tendency to allow fans to run at higher speeds and power consumption levels, and voltage applied to the fans does not result in uniform fan speed even for tightly controlled voltages.

In an open loop multiple fan system, there can be substantial variation between fans as to how fast the fans operate when a voltage is applied to them. A commanded voltage is applied, amplified with a pulse width modulator, and applied to fans. In this type of system, because of tolerances on the fans, the fans do not run at identical speeds, even though the input voltage going into the fans is accurately controlled. There can be a noticeable speed difference between fans. If the fans are not operating at the same speed, then the fan operating at a faster speed actually may end up putting air in reverse through the slower turning fan, depending on how much speed difference there is. In a situation where one fan of a multiple fan system is beginning to wear out, and it is turning considerably slower than another fan, air can be forced backward through the failing fan.

Additionally, failure of cooling system components may interrupt service and is highly undesirable. Management of the system cooling, therefore, is necessary. For the reasons stated above, and for other reasons stated below which will become apparent to those skilled in the art upon reading and understanding the present specification, there is a need in the art for a system and method of managing an electronic equipment cooling system, and for improved tolerances in managing fan operating speeds.

SUMMARY

The above-mentioned problems with electronic equipment cooling systems and other problems are addressed by the present invention and will be understood by reading and studying the following specification.

In one embodiment, a fan control system includes a fan having a tachometer output signal indicative of actual fan speed, a fan power controller to generate a power signal to control a speed of the fan, and a feedback control module to adjust the speed of the fan to a desired speed given the actual fan speed.

In another embodiment, a closed loop fan control system includes a fan, a fan power controller connected to provide a power signal to the fan, and a feedback control module to adjust an operating speed of the fan to match a desired fan speed. The feedback control module includes a frequency to voltage converter to receive a tachometer output from the fan and to generate a signal representative of an actual fan speed, a speed error amplifier to receive the signal representative of actual fan speed and a speed control signal representative of a desired fan speed, and to generate a voltage control signal, and an output voltage error amplifier to receive the voltage control signal and a feedback signal from the fan power controller. The output voltage error amplifier generates a new control signal to the fan power controller.

In still another embodiment, an air-cooling system includes an electric fan, a control module coupled to adjust an operating speed of the electric fan based on a desired fan operating speed and an actual fan operating speed, and a feedback loop to provide a signal representative of actual fan operating speed and a fan power control signal to the control module.

In yet another embodiment, an air-cooling system including an electric fan has a control module coupled to adjust an operating speed of the electric fan based on a desired operating speed and an actual operating speed.

In still another embodiment, a method for controlling a fan operating speed includes generating a speed control signal indicative of a desired fan operating speed, feeding back a known fan operating speed to a speed error amplifier, generating a voltage control signal to adjust the known fan operating speed to the desired fan operating speed, and adjusting the actual fan operating speed with a fan power controller receiving the voltage control signal.

In yet another embodiment, a method for controlling the operation of a fan includes generating a speed control signal indicative of a desired fan speed, and applying the speed control signal and a feedback actual fan speed signal to a speed error amplifier. The speed control signal and the actual fan speed signal are compared in the speed error amplifier, a voltage control signal indicative of a desired adjustment to actual fan operating speed is generated, and the actual fan operating speed is adjusted to the desired fan speed.

Other embodiments are described and claimed

BRIEF DESCRIPTION OF THE DRAWINGS

FIG. 2 is a flow chart diagram of a method according to one embodiment of the present invention; and FIG. 3 is a flow chart diagram of a method according to another embodiment of the present invention.

DETAILED DESCRIPTION

Figure 1:
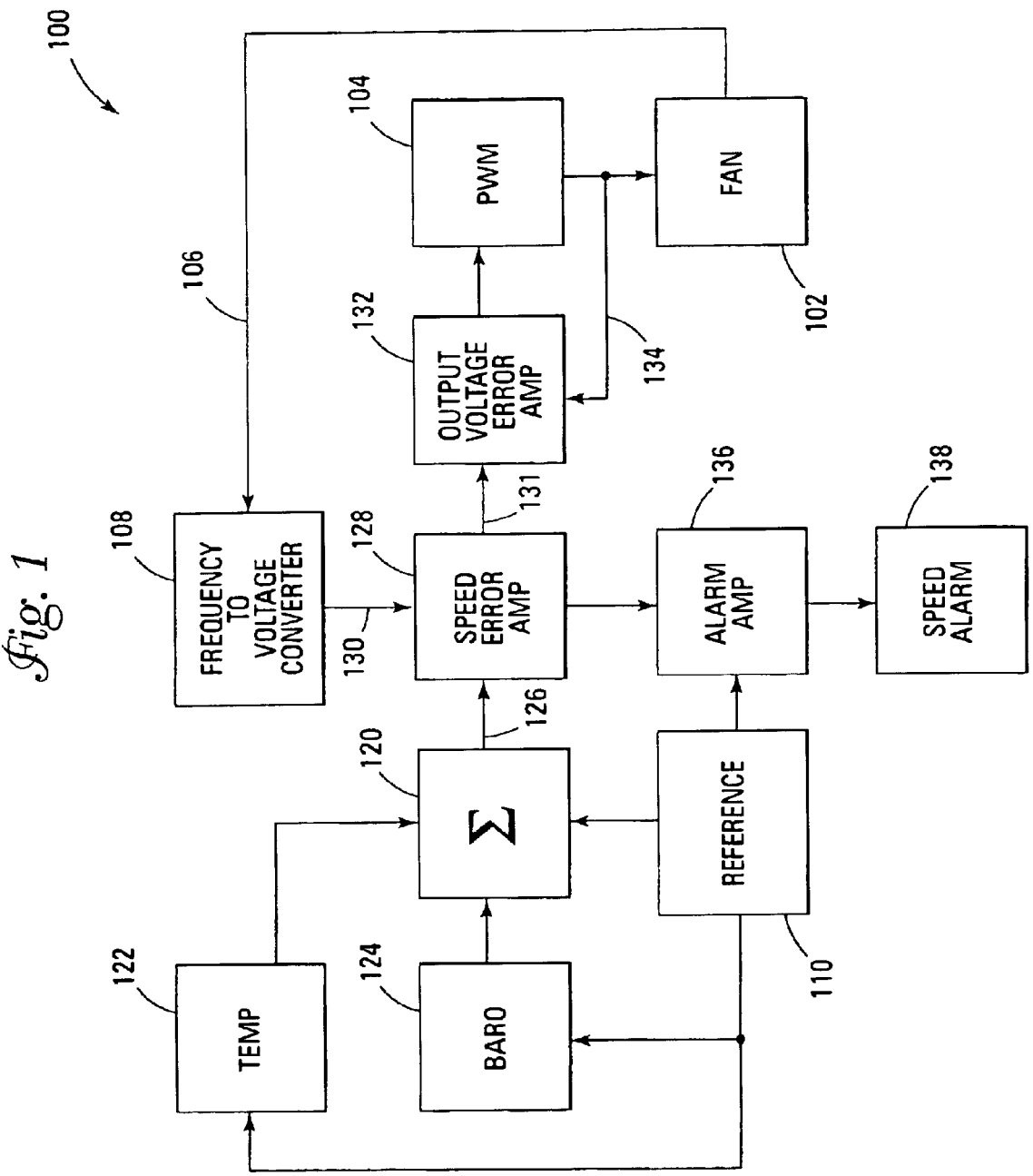
FIG. 1 is a block diagram of a fan control system according to one embodiment of the present invention.

In the following detailed description of the preferred embodiments, reference is made to the accompanying drawings, which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

FIG. 1 is a block diagram of a fan control system 100 according to one embodiment of the present invention. Control system 100 comprises a fan 102 which is controlled with pulse width modulator (PWM) 104. Fan 102 has a tachometer output 106 which is connected to a frequency to voltage converter 108. The frequency to voltage converter 108 accepts the tachometer frequency signal and converts it to a voltage proportional to the actual speed for the fan 102.

The fan speed can be varied by adjusting its DC supply voltage. For example, the supply voltage can be changed in one embodiment over a range of 6V to 14V to change the fan speed. In one embodiment, the fan supply voltage is a nominal 10 volts to provide adequate system cooling at 25° C. and sea level elevation. The fan voltage, however, in one embodiment is limited to no less than 10 volts. When either the temperature or elevation increases, the fan voltage is increased. For example, the fan voltage is 14 volts at 45° C. at sea level, 25° C. at 11,000 ft altitude, or lesser combinations of temperature and altitude.

Fan 102 is powered by a signal from adjustable PWM 104. The PWM is controlled, as explained below, to allow for better cooling and operation of equipment as temperature and elevation change, and as feedback from the fan's actual speed versus target speed are received. As stated above, acoustical noise limitations often limit the speeds of the fans at room temperature. These noise limitations are often not specified at temperatures above room temperature (25° C.).

In one embodiment, voltages from 36 to 75 volts are available in a telecommunications system or the like from a central office battery. These voltages are stepped down to a fan operating range of about 10 to 15 volts. In this embodiment, 10 volts is an approximate minimum voltage because the fan has a tendency to not rotate well at low temperatures around −40° C. Below 10 volts, there is a tendency for the fan to stall. The typical high voltage for fan operation of 15 volts is in this embodiment the highest voltage that the fan manufacturer recommends into the fan for an extended period of time.

Speed sensing circuitry within the fan is provided to measure the operating speed of the fans. The speed sensing circuitry supplies the tachometer output 106. The efficiency of fans may deteriorate with age. This can result in a reduced operating speed for a given input voltage. In addition, fans can suffer from operational failure and stop cooling the equipment. If fan speed drops, this is reflected in the tachometer output 106 for fan 102.

Temperature block 122 and barometric block 124 of a speed control module gather temperature and elevation information. The information from those two sensors is summed together in amplifier 120, and compared to a reference 110. The summation, along with known compensation for temperature and barometric conditions, produces a speed control signal 126. Given temperature and barometric conditions determined by temperature sensor 122 and barometric sensor 124, which are fed to summing control circuit 120, and reference 110 also supplied to summing control circuit 120, a speed control signal $V_{cs}$ 126 is generated. The summing control circuit 120 uses known temperature and elevation compensation to generate the control signal compensated for temperature and elevation differences from standard. In general, the amplifier provides a fan speed control signal 126 that increases the fan speed as the temperature and/or altitude increase. The $V_{cs}$ 126, or signal indicative of desired fan speed, is connected to speed error amplifier 128, along with the voltage signal 130 representative of the actual fan speed as determined by frequency to voltage converter 108.

The control speed voltage 126 is provided to summing amplifier 128, along with the output 130 from frequency to voltage converter. The control speed signal is the desired speed of the fan 102 given temperature and barometric conditions. The speed error amplifier 128 compares the two speeds $V_{cs}$ 126 and actual speed 130, and generates a voltage control correction signal $V_{cv}$ 131, which is supplied to an output voltage error amplifier 132. This error amplifier 132 receives feedback 134 signals from the PWM 104 regarding its power output to the fan 102, and dynamically adjusts the power supply of the fan 102 to control fan operational speed.

It will be appreciated by those skilled in the art, with the benefit of the present description, that the system can control more than one fan. The description has been simplified to better understand the present invention. In addition, the present invention can be implemented on a single fan to adjust speed based on temperature and elevation. The failure detection circuitry can still be implemented in this embodiment.

In a multiple fan system, if a fan failure is experienced by one fan, the controller 120 increases the speed of the remaining fan or fans to compensate for the reduced cooling capacity.

As a fan begins to wear out and turn slower, at normal operating ambient temperatures, the fan is typically operating at a small percentage of its maximum capacity. A considerable amount of fan wear is able to be compensated with a control loop as described above. If the fan is running 25 or 30 percent slower than desired, but is only running at 60 percent of capacity, that can easily be compensated for in the embodiments of the present invention. The various embodiments automatically apply more voltage and more power to the fan to get it up to speed. This improves fan lifetime, as a failing fan, by virtue of its not operating at maximum capacity for most situations, is still acceptable for many situations.

Alarm condition: Whenever fan speed of fan 102 is below (or above) a predetermined threshold, for example 75% (or 125%) of nominal, an alarm condition is generated in speed alarm 138 to adjust system parameters and to signal for system maintenance. Alarm amplifier 136 receives a speed error signal from speed error amplifier 128. This signal is representative of the difference in speed desired (Vcs) for fan 102 and the actual speed of the fan 102. The present invention is not limited to 75%, but can be any desired level of the nominal speed, such as 60, 70, 80 or 90%. Under alarm conditions, system parameters are adjusted so as to increase the fan speed to compensate for reduced efficiency of operation until service can be performed. As has been mentioned, due to tolerances and the like, many fans can continue to provide proper cooling even as their efficiencies drop because most fans do not run at peak for typical operation. Therefore, different settings for alarm conditions are used in various embodiments, especially at operating temperatures and elevations that do not typically tax a fan.

A method 200 for controlling the operation of a fan is shown in flow chart diagram in FIG. 2. Method 200 comprises generating a speed control signal in block 202. The speed control signal indicates a desired fan speed. The speed control signal is applied, along with an actual fan speed signal, to a speed error amplifier in block 204, which compares the two speeds and generates a voltage control signal indicative of a desired adjustment to actual fan speed. This signal is amplified in an output voltage error amplifier in block 206 which receives the voltage control signal and a feedback signal from a PWM powering a fan. The output voltage error amplifier supplies a signal to control the PWM to adjust the fan power supply in block 208. The fan supplies a tachometer output to a frequency to voltage converter, which generates the actual fan speed signal.

A PWM drives the fan. A tachometer output of the fan is applied to the frequency to voltage converter. In this embodiment, a voltage controlled speed signal is applied to the PWM, the fan speed is sensed, and the sensed speed is compared to the desired speed $V_{cs}$ in a closed loop situation. Desired speed and actual speed are compared, and the difference is amplified with a high gain amplifier feedback control. That produces the voltage control to servo the fan to the correct operating point.

Given temperature and barometric conditions a speed control signal is generated. The speed control signal is fed to amplifier 128, which is in a feedback loop that generates a voltage control signal 131 to power the fan 102 at the specific desired speed. The actual fan speed is determined through the method discussed above, the tachometer output from the fan, which is fed back in to the output voltage error amplifier 132. The feedback adjusts the speed of the fan to the desired speed. If a speed error is output to alarm amplifier 136 and if the fan speed falls below or goes above a certain speed that is outside of the tolerance band given conditions, an alarm is generated by speed alarm 138.

Another method 300 of controlling a fan operating speed comprises generating a speed control signal indicative of a desired fan operating speed in block 302, and feeding a known fan operating speed back to a speed error amplifier in block 304. The speed control signal and the known fan operating speed signal are compared in the speed error amplifier in block 306, and a voltage control signal is generated in block 308. The voltage control signal is used to adjust the fan operating speed. In one embodiment, this is accomplished using a fan power controller, such as a pulse width modulator as described above.

While the circuits and methods described above have been described with respect to one fan in a closed loop circuit, it should be understood that the number of fans is scaleable, and that such a scaling of the number of fans is within the scope of the present invention.

Advantages to the embodiments of the present invention include by way of example only and not by way of limitation, less frequent service required under normal conditions or less than maximum ambient or altitude conditions being subjected to the system, longer fan life, and stricter tolerance on fan operating speed.

It will be appreciated by those skilled in the art, with the benefit of the present disclosure, that the circuitry can be modified without departing from the present invention.

It should also be understood that the herein described methods and modules, or portions thereof, may be implemented in whole or in part in various embodiments in a machine readable medium comprising machine readable instructions for causing a computer to perform the methods or effect the operation of the modules. The computer programs run on a central processing unit out of main memory, and may be transferred to main memory from permanent storage via disk drive or CD-ROM drive when stored on removable media or via a network connection or modem connection when stored outside of the computer, or via other types of computer or machine readable media from which it can be read and utilized.

Such machine readable media may include software modules and computer programs. The computer programs may comprise multiple modules or objects to perform the described methods or the functions of the various apparatuses. The type of computer programming languages used to write the code may vary between procedural code type languages to object oriented languages. The files or objects need not have a one to one correspondence to the modules or method steps described depending on the desires of the programmer. Further, the method and apparatus may comprise combinations of software, hardware and firmware as is well known to those skilled in the art.

Conclusion

A control system and method have been described to actively adjust fan speed in a closed loop system. The system includes one or more electric fans. The operational speed of the fan(s) is adjusted in a closed loop.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A fan control system, comprising:
    a fan having a tachometer output signal indicative of actual fan speed;
    a fan power controller to generate a power signal to control a speed of the fan; and
    a feedback control module to adjust the speed of the fan to a desired speed given the actual fan speeds
    wherein the feedback control module comprises;
        a frequency to voltage converter to receive the tachometer output from the fan and to generate a signal representative of an actual fan speed;
        a speed error amplifier to receive the signal representative of actual fan speed and a speed control signal representative of a desired fan speed, and to generate a voltage control signal; and
        an output voltage error amplifier to receive the voltage control signal and a feedback signal from the fan power controller, the output voltage error amplifier generating a control signal to the fan power controller.

2. The fan control system of claim 1, and further comprising:
    a speed control module to generate the speed control signal, the speed control module comprising:
    a temperature block;
    a barometric block; and
    a summing amplifier to generate the speed control signal based on observed temperature and barometric conditions.

3. The fan control system of claim 1, and further comprising a speed error control module.

4. The fan control system of claim 3, wherein the speed error control module comprises:
    an alarm amplifier connected to receive a speed error signal from the speed error amplifier; and
    a speed alarm connected to the alarm amplifier to generate a speed alarm when the fan speed reaches a predetermined threshold speed.

5. The fan control system of claim 1, wherein the fan power controller is a pulse width modulator.

6. A closed loop fan control system, comprising:
    a fan;
    a fan power controller connected to provide a power signal to the fan; and a feedback control module to adjust an operating speed of the fan to match a desired fan speed, the feedback control module comprising:
a frequency to voltage converter to receive a tachometer output from the fan and to generate a signal representative of an actual fan speed;
a speed error amplifier to receive the signal representative of actual fan speed and a speed control signal representative of a desired fan speed, and to generate a voltage control signal; and
an output voltage error amplifier to receive the voltage control signal and a feedback signal from the fan power controller, the output voltage error amplifier generating a new control signal to the fan power controller.

7. The fan control system of claim 6, and further comprising:
a speed control module to generate the speed control signal, the speed control module comprising:
a temperature block;
a barometric block; and
a summing amplifier to generate the speed control signal based on observed temperature and barometric conditions.

8. The fan control system of claim 7, and further comprising a speed error control module.

9. The fan control system of claim 8, wherein the speed error control module comprises:
an alarm amplifier connected to receive a speed error signal from the speed error amplifier; and
a speed alarm connected to the alarm amplifier to generate a speed alarm when the fan speed reaches a predetermined threshold speed.

10. An air-cooling system comprising:
an electric fan;
a control module coupled to adjust an operating speed of the electric fan based on a desired fan operating speed and an actual fan operating speed; and
a feedback loop to provide a signal representative of actual fan operating speed and a fan power control signal to the control module;
wherein the control module comprises:
a fan power controller connected to provide the fan power control signal;
a frequency to voltage converter to receive a tachometer output from the fan and to generate a signal representative of the actual fan operating speed;
a speed error amplifier to receive the signal representative of the actual fan operating speed and a speed control signal representative of a desired fan operating speed, and to generate a voltage control signal; and
an output voltage error amplifier to receive the voltage control signal and a feedback signal from the fan power controller, the output voltage error amplifier generating an operating speed signal control signal to the fan power controller.

11. The fan control system of claim 10, and further comprising:
a speed control module to generate the speed control signal, the speed control module comprising:
a temperature block;
a barometric block; and
a summing amplifier to generate the speed control signal based on observed temperature and barometric conditions.

12. The fan control system of claim 10, and further comprising a speed error control module.

13. The fan control system of claim 12, wherein the speed error control module comprises:
an alarm amplifier connected to receive a speed error signal from the speed error amplifier; and
a speed alarm connected to the alarm amplifier to generate a speed alarm when the fan speed reaches a predetermined threshold speed.

14. An air-cooling system including an electric fan, comprising
a control module coupled to adjust an operating speed of the electric fan based on a desired operating speed and an actual operating speed; wherein the control module comprises:
a fan power controller connected to provide the fan power control signal;
a frequency to voltage converter to receive a tachometer output from the fan and to generate a signal representative of the actual fan operating speed;
a speed error amplifier to receive the signal representative of the actual fan operating speed and a speed control signal representative of a desired fan operating speed, and to generate a voltage control signal; and
an output voltage error amplifier to receive the voltage control signal and a feedback signal from the fan power controller, the output voltage error amplifier generating an operating speed signal control signal to the fan power controller.

15. The fan control system of claim 14, and further comprising:
a speed control module to generate the speed control signal, the speed control module comprising:
a temperature block;
a barometric block; and
a summing amplifier to generate the speed control signal based on observed temperature and barometric conditions.

16. The fan control system of claim 14, and further comprising a speed error control module.

17. The fan control system of claim 16, wherein the speed error control module comprises:
an alarm amplifier connected to receive a speed error signal from the speed error amplifier; and
a speed alarm connected to the alarm amplifier to generate a speed alarm when the fan speed reaches a predetermined threshold speed.

18. fan control system, comprising:
an electric fan;
a fan power controller connected to provide a fan power control signal;
a control module coupled to adjust an operating speed of the electric fan based on a desired fan operating speed and an actual fan operating speed comprising:
a frequency to voltage converter to receive a tachometer output from the electric fan and to generate a signal representative of the actual fan operating speed;
a speed error amplifier to receive the signal representative of actual fan speed an a speed control signal representative of the desired fan operating speed and to generate a voltage control signal; and
an output voltage error amplifier to receive the voltage control signal and a feedback signal from the fan power controller, the output voltage error amplifier generating a new control signal to the fan power controller;

a feedback loop to provide a signal representative of actual fan operating speed and fan power control signal to the control module; and a speed error control module to generate an alarm when the actual fan operating speed reaches a predetermined threshold speed.

19. A method for controlling a fan operating speed, comprising:

receiving a tachometer output signal from the fan and generating a signal representative of an actual fan operating speed at a frequency to voltage converter;

generating a speed control signal indicative of a desired fan operating speed;

feeding back the actual fan operating speed and the speed control signal indicative of the desired fan operating speed to a speed error amplifier;

generating a voltage control signal to adjust the known fan operating speed to the desired fan operating speed at the speed error amplifier; and adjusting the actual fan operating speed with a fan power controller receiving the voltage control signal using a feedback control module.

20. The method of claim 19, wherein generating a speed control signal comprises:

adjusting a base speed control signal according to known temperature and barometric compensation factors.

21. The method of claim 19, wherein feeding back a known fan operating speed comprises:

feeding the tachometer output signal from the fan to the frequency to voltage converter; and converting the tachometer output signal to a voltage signal representative of the known fan operating speed.

22. The method of claim 19, wherein generating a voltage control signal comprises:

comparing the speed control signal to the known fan operating speed signal in the speed error amplifier.

23. The method of claim 19, wherein adjusting the actual fan operating speed comprises:

feeding back a fan power control signal to an output voltage error amplifier;

applying the voltage control signal to the output voltage error amplifier; and generating a fan power control signal to control the fan power controller.

24. The method of claim 19, and further comprising:

generating an alarm when the known fan operating speed drops below a predetermined threshold.

25. A method for controlling the operation of a fan, comprising:

generating a speed control signal indicative of a desired fan speed at a frequency to voltage converter;

applying the speed control signal and a feedback actual fan speed signal to a speed error amplifier;

comparing the speed control signal and the actual fan speed signal in the speed error amplifier;

generating a voltage control signal indicative of a desired adjustment to actual fan operating speed at the speed error amplifier;

receiving the voltage control from an output voltage error amplifier and a feedback signal from a fan power controller, the output voltage error amplifier generating a new control signal to the fan power controller; and adjusting the actual fan operating speed to the desired fan speed using a feedback control module.

26. The method of claim 25, and further comprising:

generating an alarm when the known fan operating speed drops below a predetermined threshold.

* * * * *